United States Patent
Akahoshi et al.

(10) Patent No.: US 7,593,299 B2
(45) Date of Patent: Sep. 22, 2009

(54) OPTICAL DISK RECORDING/REPRODUCING APPARATUS AND OPTICAL DISK RECORDING/REPRODUCING METHOD

(75) Inventors: Kenji Akahoshi, Yokohama (JP); Taku Hoshizawa, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 667 days.

(21) Appl. No.: 11/295,333

(22) Filed: Dec. 5, 2005

(65) Prior Publication Data

US 2006/0245322 A1 Nov. 2, 2006

(30) Foreign Application Priority Data

Apr. 28, 2005 (JP) ............................. 2005-130738

(51) Int. Cl.
G11B 7/00 (2006.01)
(52) U.S. Cl. ................ 369/47.54; 369/53.2; 369/53.22; 369/53.45
(58) Field of Classification Search ........................ None
See application file for complete search history.

(56) References Cited

U.S. PATENT DOCUMENTS

| 6,243,796 | B1 | 6/2001 | Otsuka | |
|---|---|---|---|---|
| 6,906,987 | B2 | 6/2005 | Kim | |
| 2002/0122362 | A1* | 9/2002 | Fukumoto et al. | 369/44.29 |
| 2002/0186634 | A1 | 12/2002 | Shiozawa et al. | |
| 2005/0185537 | A1* | 8/2005 | Ninomiya | 369/44.33 |

FOREIGN PATENT DOCUMENTS

| CN | 1177808 | A | 4/1998 |
|---|---|---|---|
| CN | 1428769 | A | 7/2003 |
| JP | 10-269576 | A | 10/1998 |
| JP | 2002-367174 | | 12/2002 |

(Continued)

OTHER PUBLICATIONS

State Intellectual Property Office of China (SIPO) office action dated Feb. 1, 2008 for SIPO application CN2005-101340092.
State Intellectual Property Office of China (SIPO) office action dated Jun. 1, 2007 for SIPO application CN2005-101340092.

(Continued)

*Primary Examiner*—Muhammad N. Edun
(74) *Attorney, Agent, or Firm*—Townsend and Townsend and Crew LLP

(57) ABSTRACT

A verify operation is the one that is carried out to further improve reliability of recorded data. Because recording and reproduction are made repeatedly, however, the same time is consumed for reproduction even if recording is made at a double-speed, for example, and recording is substantially equal to recording at a normal recording speed. The verify operation is effective for further improving reliability but reduces the substantial recording speed to a half. To improve recording performance by automatically turning ON and OFF the verify operation in accordance with disks, medium information called "media ID" unique to a disk is acquired in a read-in area of the optical disk. The existence/absence of the verify operation is determined on the basis of a matrix table of an existence/absence of the verify operation corresponding on the 1:1 basis to each media ID provided in advance to an optical disk drive.

12 Claims, 2 Drawing Sheets

FOREIGN PATENT DOCUMENTS

| | | |
|---|---|---|
| JP | 2003-296928 A | 10/2003 |
| JP | 2004-062975 A | 2/2004 |
| JP | 2004-185477 A | 7/2004 |

OTHER PUBLICATIONS

Japan Patent Office (JPO) office action for JPO patent application JP2005-130738 (Oct. 7, 2008).

* cited by examiner

FIG.2A

| MEDIA ID | EXISTENCE/ABSENCE OF VERIFY OPERATION |
|---|---|
| AAA1234Z | NOT MADE |
| BBB1234Z | MADE |
| CCC1234Z | NOT MADE |
| DDD1234Z | NOT MADE |
| ... | ... |

| RECORDING POSITION | EXISTENCE/ABSENCE OF VERIFY OPERATION |
|---|---|
| 30000h~200000h | NOT MADE |
| 200000h~ | MADE |

| DISK QUALITY PARAMETER | EXISTENCE/ABSENCE OF VERIFY OPERATION |
|---|---|
| 0~9 | NOT MADE |
| 10~19 | NOT MADE |
| 20~29 | NOT MADE |
| 30~39 | MADE |
| ... | ... |

203

OPTICAL DISK RECORDING/REPRODUCING APPARATUS AND OPTICAL DISK RECORDING/REPRODUCING METHOD

INCORPORATION BY REFERENCE

The present application claims priority from Japanese application JP2005-130738 filed on Apr. 28, 2005, the content of which is hereby incorporated by reference into this application.

BACKGROUND OF THE INVENTION

1. Field of the Invention

This invention relates to an optical disk recording/reproducing apparatus and more specifically to a verify operation process of a rewritable optical disk.

2. Description of the Related Art

Recording/reproducing apparatuses are known at present that irradiate a laser beam for recording by using a semiconductor laser to optical disk-like recording media (hereinafter called "optical disk") typified by CD-R/RW (CD Recordable/Rewritable), DVD±R/RW (DVD±Recordable/Re-recordable Disk) and DVD-RAM (DVD-Re-writable).

Among them, the rewritable type DVD-RAM, in particular, executes a "verify" operation" that always reproduces recorded data during recording to improve reliability of the recorded data.

This technology is described in JP-A-2002-367174, for example.

SUMMARY OF THE INVENTION

"Verify" is the operation that is carried out to further improve reliability of recorded data. Because recording and reproduction are made repeatedly, however, the same time is consumed for reproduction even if recording is made at a double-speed, for example, and this recording is substantially equal to recording at a normal recording speed. The verify operation is effective for further improving reliability but involves the problem that the substantial recording speed is reduced to a half.

Generally, a user cannot select ON/OFF of this verify operation. However, since DVD-RAM is a medium in which the verify operation is made inside a drive, a system that enables the user to manually select ON/OFF has recently been put on the market. Nonetheless, it is not advisable for the users to manually turn ON/OFF the verify operation without knowing disk quality.

It is therefore an object of the invention to improve recording performance by causing a drive itself to turn ON/OFF a verify operation in accordance with a disk.

The object can be accomplished by the following construction.

First, an optical disk recording/reproducing apparatus of the invention comprises a verify unit for reproducing data recorded to an optical disk having a media ID as information unique thereto after the data is recorded to the optical disk, comparing the reproduced data with the recorded data and confirming coincidence of the data, an acquisition unit for acquiring the media ID from the optical disk, and a table for judging the existence/absence of the verify operation in accordance with the media ID.

An optical disk recording/reproducing method of an optical disk recording/reproducing apparatus according to the invention comprises the steps of reproducing data recorded to an optical disk having media ID as information unique thereto after the data is recorded to the optical disk, comparing the reproduced data with the recorded data, conducting a verify operation to confirm coincidence of the data, acquiring media ID from the optical disk, and determining the existence/absence of the execution of the verify operation in accordance with the media ID obtained on the basis of a table for judging the existence/absence of the verify operation.

The invention can execute the verify operation that is suitable for quality of the disk.

Other objects, features and advantages of the invention will become apparent from the following description of the embodiments of the invention taken in conjunction with the accompanying drawings.

BRIEF DESCRIPTION OF THE DRAWINGS

FIGS. 2A to 2C are matrix tables for determining the existence/absence of a verify operation.

DESCRIPTION OF THE EMBODIMENTS

Figure 1:
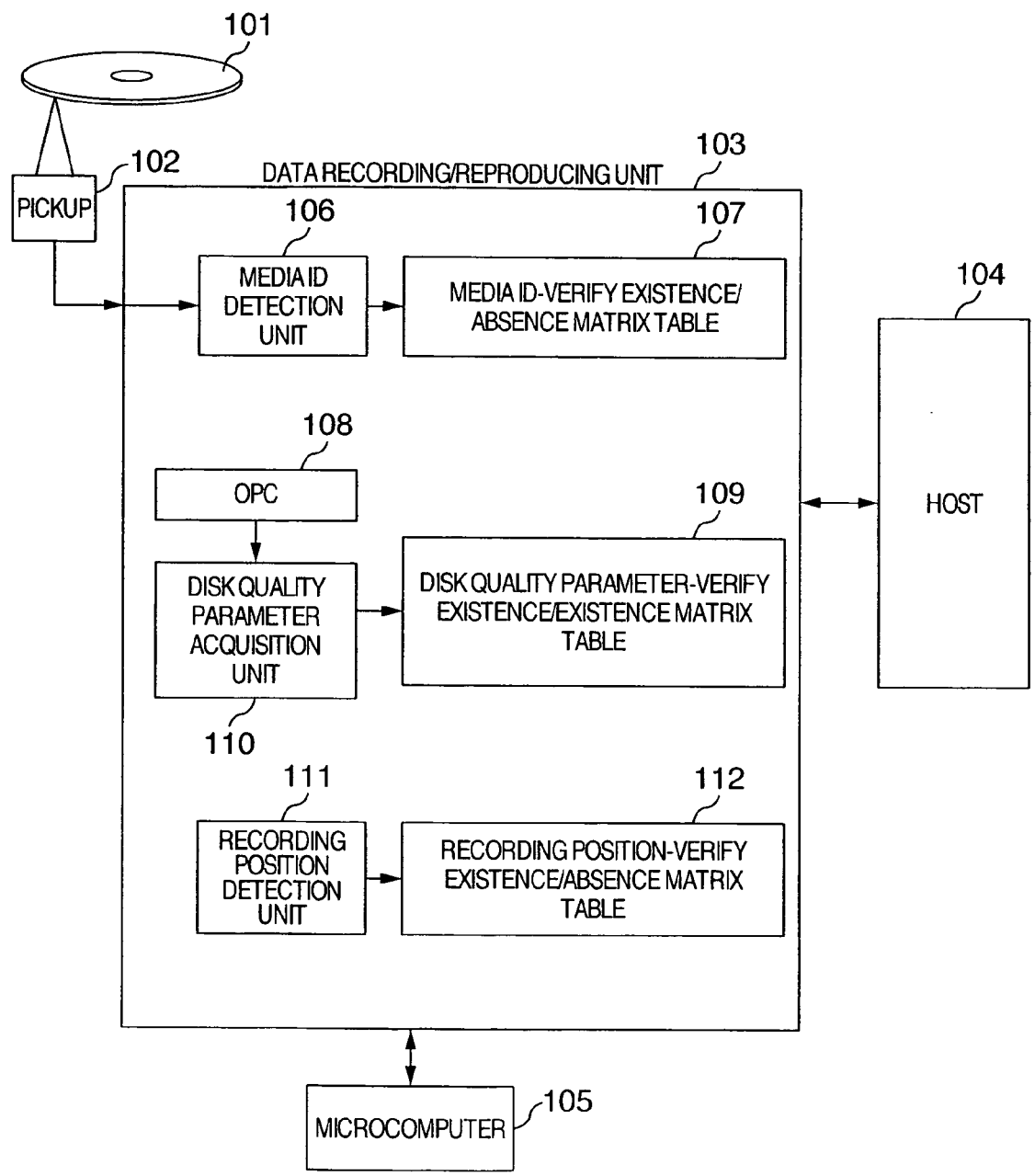
FIG. 1 is a block view showing a construction of a recording/reproducing apparatus.

In an optical disk recording/reproducing apparatus of the type which conducts a verify operation by reproducing recorded data immediately after recording of the data to an optical disk, comparing the reproduced data with the recorded data and which confirms coincidence of these data, an optical disk recording/reproducing apparatus according to the invention includes an acquisition unit for acquiring a media ID from the optical disk and a table for judging the existence/absence of the verify operation in accordance with the media ID and makes it possible to specify the medium from the media ID and to conduct an appropriate verify operation in accordance with disk quality.

Embodiment 1

Media information called "media ID" (name of disk manufacturer, media type number) unique to an optical disk is recorded to a read-in area of the optical disk and an optical disk drive acquires the media ID unique to this medium and specifies the medium. For example, the medium is used for applications for determining an appropriate write strategy. The write strategy is a technology that controls laser power so that appropriate recording can be made in accordance with each standard of media or even within the same standard, appropriate recording can be made at a double-speed.

This embodiment of the invention specifies the disk loaded into the optical disk drive from the medium manufacturer, the medium type number, etc, by utilizing this media ID and judges whether or not to verify this disk on the basis of a matrix table of verify ON/OFF that corresponds on the 1:1 basis to each media ID stored in advance in the optical disk drive.

Next, an embodiment of the invention will be explained with reference to the accompanying drawings.

FIG. 1 is a block view showing a construction of a recording/reproducing apparatus according to the embodiment of the invention. The explanation will be given with reference to the drawings.

Referring to FIG. 1, reference numeral 101 denotes an optical disk to which medium information (name of medium manufacturer, medium type number, etc) unique to the disk is in advance recorded and which can record data and reproduce the recorded data. Reference numeral 102 denotes a pickup for reading a recording signal from the optical disk 101. Reference numeral 103 denotes a data recording/reproducing unit. The data recording/reproducing unit 103 includes all those units which are necessary for outputting the data read out from the pickup to a host 104 of an external apparatus or for recording the data from the host 104 to the disk, such as a serve control unit for controlling the pickup 102, a unit for modulating and demodulating the data, an error correction unit, a temporary storage unit for temporarily storing the data, a temporary storage control unit for controlling the temporary storage unit, a host I/F unit for exchanging the data with the host 104 in accordance with a protocol typified by ATAPI (AT Attachment Packet Interface), etc, that are not shown in the drawing. Reference numeral 105 denotes a microcomputer for controlling the data recording/reproducing unit.

Reference numeral 106 denotes a media ID detection unit for reading out the media information unique to the disk recorded to the optical disk 101. Reference numeral 107 denotes an existence/absence matrix table of the media ID-verify operation that in turn represents the existence/absence of the verify operation corresponding on the 1:1 basis to each media ID. Reference numeral 108 denotes an OPC unit. Reference numeral 110 denotes a disk quality parameter acquisition unit for acquiring disk quality parameters collected from the recording area to which recording is made with appropriate power determined by the OPC unit 108. Reference numeral 109 denotes an existence/absence table of a disk quality parameter-verify operation representing the existence/absence of the verify operation corresponding on the 1:1 basis to disk quality. Reference numeral 111 denotes a recording position detection unit for acquiring a recording position (address) in the optical disk 101. Reference numeral 112 denotes an existence/absence matrix table of a recording position-verify operation representing the existence/absence of a verify operation corresponding on the 1:1 basis to the recording position.

Next, the existence/absence judgment method of the verify operation will be explained about three examples.

The first is the example where the existence/absence judgment of the verify operation is made by the media ID.

An ID unique to an optical disk is allocated to the disk. This unique ID inherent to the disk is called "media ID" and the name of a media manufacturer producing the disk and a medium type number are recorded to the media ID. Therefore, judgment of a quality level of the disk can be judged if this media ID is known.

A quality examination of disks by each manufacturer is made in advance so that this judgment can be made. Examination is made as to whether or not the disk can keep recording quality even when the disk does not have verification and the existence/absence matrix data of the appropriate verify operation for each media ID as represented by 201 (which corresponds to 107 in FIG. 1) in FIG. 2A can be acquired.

In other words, the existence/absence of the appropriate verify operation that is registered in advance is judged on the basis of this matrix table 107 when a medium having inferior quality is loaded. The disk drive conducts the verify operation on the basis of the judgment result. The verify operation is carried out to improve reliability of the disks having inferior quality and is not carried out for the disks having high quality to increase substantially and drastically the recording rate and to improve recording performance.

In the second example, the existence/absence judgment of the verify operation is carried out at the recording position of the disk. Generally, defects are likely to concentrate much more on the outer peripheral areas of the optical disk than on the inner peripheral areas due to warp of the disk, fingerprints, and so forth.

Therefore, the existence/absence judgment of the verify operation corresponding to the recording position is feasible if it is possible to judge from which position (address) quality of the disk starts deteriorating.

The quality examination of the disks by each manufacturer is made in advance to examine as to from which disk area the disks can keep recording quality without verification and the existence/absence matrix data of the appropriate verify operation for each media ID as represented by 202 (which corresponds to 112 in FIG. 1) in FIG. 2B can be acquired.

In other words, the existence/absence of the appropriate verify operation registered in advance is judged during recording on the basis of this matrix table 112. The disk drive conducts the verify operation when the disk gets over a certain position on the basis of the judgment result. The verify operation is carried out for the outer peripheral area having low quality to improve reliability and is not carried out for the inner peripheral area having high quality to increase substantially and drastically the recording rate and to improve recording performance.

It is also possible to carry out the verify operation for only the outer peripheral area of a specific media ID but not for the inner peripheral area by combining this second method with the first method.

Lastly, the third example that conducts the existence/absence judgment of the verify operation by means of the recording position of the disk will be explained.

The handling of an unknown medium not registered to the table is explained as follows.

Before recording to the disk is started, laser power adjustment called "OPC" (Optimum Power Calibration) for setting an irradiation intensity of the laser beam to be irradiated to the optical disk is conducted without fail. Trial write is made to a specific area (trial write area, for example) inside the disk at optimum power obtained from an OPC unit 108, or the like, and this written portion is read. Next, parameters as criteria for determining disk quality (such as a β value (index obtained by converting pit depth to numeric value), degree of modulation (longest recording mark and peak-to-peak value occurring depending on space), a PI error number, a jitter number, etc) through a disk quality parameter acquisition unit 110.

An existence/absence matrix table 203 (which corresponds to 109 in FIG. 1) of a disk quality verify operation is worked out in the same way as the existence/absence table 201 of the media ID verify operation and by so doing, the existence/absence of the verify operation can be made in accordance with quality of the medium for unknown disks (FIG. 2C).

The numerical values of the disk quality parameters shown in the table 203 are merely exemplary and do not have any specific meaning. The explanation will be given about a practical example. When the disk quality parameter is the degree of modulation, a matrix table is necessary that turns OFF the verify operation provided that a numerical value of at least a certain level is secured because the degree of modulation satisfies 60% or more of the rated value to read the disk by a DVD player.

Though the example of the disk having an unknown media ID is hereby described, the existence/absence of the verify operation may naturally be determined for all the disks by using only the disk quality parameters without using the disk ID.

In other words, this matrix table can be prepared freely in such a fashion as to turn OFF the verify operation for those disks which are known in advance as approved disks or to determine the verify operation on the basis of the disk quality parameters for those disks having unknown media ID. In this way, the existence/absence of the appropriate verify operation can be determined in accordance with disk quality.

The table can be easily updated for unknown media, too, by updating this matrix table 107 by firm-ware updating, or the like.

The table can also be updated by the recording/reproducing apparatus itself without using firm-ware updating by arranging a rewritable area inside the recording/reproducing apparatus, acquiring the disk quality parameters for unknown media and additionally registering the existence/absence judgment of the verify operation for the media ID.

According to this embodiment, it becomes possible to specify the disk loaded to the optical disk drive through the name of the media manufacturer and the media type number by using the media ID, to judge the existence/absence of the verify operation on the basis of the existence/absence matrix table of the verify operation corresponding on the 1:1 basis to various media ID, that is in advance stored inside the optical disk drive, and thus to improve reliability for media having low quality by ordinarily turning ON the verify operation and to conduct the suitable verify operation for media having good quality in match with disk quality by turning OFF the verify operation to increase a substantial recording rate.

The invention can be applied to recording media having a unique ID capable of specifying recording media besides all the write-once and rewritable optical disks such as DVD-RAM, Blue-ray, HD, DVD, etc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk recording/reproducing apparatus comprising:
   a verify unit which reproduces data recorded to an optical disk having a media ID as information unique thereto after the data is recorded to said optical disk, comparing the reproduced data with the recorded data and confirming coincidence of the data;
   an acquisition unit which acquires the media ID from said optical disk; and
   a table which judges the existence/absence of a verify operation in accordance with said media ID.

2. The optical disk recording/reproducing apparatus according to claim 1, which further comprises a rewritable temporary storage unit which records said table.

3. The optical disk recording/reproducing apparatus comprising:
   a verify unit which reproduces data recorded to an optical disk having a media ID as information unique thereto after the data is recorded to said optical disk, comparing the reproduced data with the recorded data and confirming coincidence of the data;
   a unit which acquires a recording position during recording to said optical disk; and
   a table which judges the existence/absence of a verify operation in accordance with said recording position.

4. The optical disk recording/reproducing apparatus according to claim 3, which further comprises a rewritable temporary storage unit which records said table.

5. The optical disk recording/reproducing apparatus comprising:
   a verify unit which reproduces data recorded to an optical disk having a media ID as information unique thereto after the data is recorded to said optical disk, comparing the reproduced data with the recorded data and confirming coincidence of the data;
   an OPC unit as a conducting laser power adjustment unit which sets an irradiation intensity of a laser beam to be irradiated to said optical disk to a suitable value;
   an acquisition unit which acquires quality parameters of said disk from an area recorded at suitable power determined by said OPC; and
   a table which judges the existence/absence of a verify operation in accordance with said quality parameters of said disk.

6. An optical disk recording/reproducing method of an optical disk recording/reproducing apparatus, comprising the steps of:
   reproducing data recorded to an optical disk having media ID as information unique thereto after the data is recorded to said optical disk;
   acquiring said media ID from said optical disk;
   determining the existence/absence of the execution of a verify operation in accordance with said media ID obtained on the basis of a table for judging the existence/absence of said verify operation; and
   comparing the reproduced data with the recorded data and executing said verify operation for confirming coincidence of the data when the execution of verify is judge as existing.

7. The optical disk recording/reproducing method according to claim 6, wherein, when said optical disk is judged as a medium having low reliability from said media ID, setting is so made as to execute said verify operation when recording is made to said optical disk, and when said optical disk is judged as a medium having high reliability from said media ID, said verify operation is not executed when recording is made to said optical disk.

8. The optical disk recording/reproducing method according to claim 6, wherein, when unknown media ID not existing inside said table information is loaded, an existence/absence judgment table of a verify operation corresponding to said quality parameters of said disk is additionally registered to said table.

9. The optical disk recording/reproducing method of an optical disk recording/reproducing apparatus, comprising the steps of:
   reproducing data recorded to an optical disk having media ID as information unique thereto after the data is recorded to said optical disk;
   determining the existence/absence of a verify operation in accordance with a result judged from a table for judging the existence/absence of said verify operation in accordance with a recording position during recording to said optical disk; and
   comparing the reproduced data with the recorded data and executing said verify operation for confirming coincidence of the data when the execution of verify is judged as existing.

10. The optical disk recording/reproducing method according to claim 9, wherein, when unknown media ID not existing inside said table information is loaded, an existence/absence judgment table of a verify operation corresponding to said quality parameters of said disk is additionally registered to said table.

11. An optical disk recording/reproducing method of an optical disk recording/reproducing apparatus, comprising the steps of:

reproducing data recorded to an optical disk having media ID as information unique thereto after the data is recorded to said optical disk;

determining the existence/absence of a verify operation from a table for judging the existence/absence of the verify operation in accordance with quality parameters of said disk collected from an area recording said data at suitable laser power determined by laser power regulation OPC for setting an irradiation intensity of laser power to be irradiated to said optical disk to a suitable value; and comparing the reproduced data with the recorded data and executing said verify operation for confirming coincidence of the data when the execution of verify is judged as existing.

12. The optical disk recording/reproducing method according to claim 11, wherein, when said optical disk is judged as a medium having low reliability from said quality parameters collected from an area recording the data at suitable power determined by said laser power adjustment OPC, setting is so made as to execute said verify operation when recording is made to said optical disk and when said optical disk is judged as a medium having high reliability from said quality parameters of said disk collected from said area recording the data at suitable power determined by said laser power regulation OPC, said verify operation is not executed when recording is made to said optical disk.

* * * * *